(12) United States Patent
Robertson et al.

(10) Patent No.: US 11,900,063 B2
(45) Date of Patent: *Feb. 13, 2024

(54) SYSTEM AND METHOD FOR ACTIONIZING COMMENTS

(71) Applicant: PRESS GANEY ASSOCIATES, LLC, South Bend, IN (US)

(72) Inventors: Kyle Robertson, Austin, TX (US); Taylor Turpen, Pflugerville, TX (US)

(73) Assignee: PRESS GANEY ASSOCIATES, INC., South Bend, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,357

(22) Filed: Nov. 5, 2021

(65) Prior Publication Data

US 2022/0058344 A1   Feb. 24, 2022

Related U.S. Application Data

(63) Continuation of application No. 16/170,428, filed on Oct. 25, 2018, now Pat. No. 11,170,172, which is a continuation-in-part of application No. 16/156,336, filed on Oct. 10, 2018, now Pat. No. 10,261,992, which is a continuation of application No. 15/277,892, filed on Sep. 27, 2016, now Pat. No. 10,114,814.

(60) Provisional application No. 62/233,657, filed on Sep. 28, 2015.

(51) Int. Cl.
*G06F 40/30* (2020.01)
*G06F 16/61* (2019.01)
*G06F 16/31* (2019.01)
*G06Q 50/22* (2018.01)

(52) U.S. Cl.
CPC ............ *G06F 40/30* (2020.01); *G06F 16/313* (2019.01); *G06F 16/61* (2019.01); *G06Q 50/22* (2013.01)

(58) Field of Classification Search
CPC ........ G06F 40/30; G06F 16/313; G06F 16/31; G06F 16/61; G06Q 50/22
See application file for complete search history.

(56) References Cited

U.S. PATENT DOCUMENTS

| | | | |
|---|---|---|---|
| 9,129,008 B1* | 9/2015 | Kuznetsov | G06F 16/435 |
| 10,162,900 B1* | 12/2018 | Chatterjee | G06F 16/334 |
| 2015/0106360 A1* | 4/2015 | Cao | G06Q 10/00 707/750 |
| 2017/0132190 A1* | 5/2017 | Koutrika | G06F 40/174 |
| 2017/0277855 A1* | 9/2017 | De La Torre | G16Z 99/00 |

* cited by examiner

*Primary Examiner* — Huyen X Vo
(74) *Attorney, Agent, or Firm* — Quarles & Brady LLP

(57) ABSTRACT

A system and method for processing and actionizing structured and unstructured experience data is disclosed herein. In some embodiments, a system may include a natural language processing (NLP) engine configured to transform a data set into a plurality of concepts within a plurality of distinct contexts, and a data mining engine configured to process the relationships of the concepts and to identify associations and correlations in the data set. In some embodiments, the method may include the steps of receiving a data set, scanning the data set with an NLP engine to identify a plurality of concepts within a plurality of distinct contexts, and identifying patterns in the relationships between the plurality of concepts.

20 Claims, 8 Drawing Sheets

TABLE ONE

| TEXT | DATE | UNIT | PERSON |
|---|---|---|---|
| My nurse was mean and she hit me | 01/01/2015 | 4E | None |
| I like the food. I do not like the beds | 01/02/2015 | 3E | None |

FIG. 4

TABLE TWO

| PHRASE ID | SENTIMENT | NAMED ENTITY | PRIMARY TAG | SECONDARY TAG | DRIVER | APPROVAL |
|---|---|---|---|---|---|---|
| 1 | Negative | None | Nurses | Courtesy and respect | None | True |
| 2 | Positive | None | Meals | Overall quality | None | True |
| 3 | Negative | None | Room | Comfort | Bed | True |

FIG. 5

TABLE THREE

| PHRASE ID | SENTIMENT | NAMED ENTITY | PRIMARY TAG | SECONDARY TAG | DRIVER |
|---|---|---|---|---|---|
| 1 | Negative | None | Nurses | Courtesy and respect | None |
| 2 | Positive | None | Meals | Overall quality | None |
| 3 | Negative | None | Room | Comfort | Bed |

FIG. 6

SYSTEM AND METHOD FOR ACTIONIZING COMMENTS

PRIORITY CLAIM

This application is a continuation of U.S. application Ser. No. 16/170,428, filed Oct. 25, 2018, which is a continuation-in-part of U.S. application Ser. No. 16/156,336, filed Oct. 10, 2018, U.S. Pat. No. 10,261,992, Issued Apr. 16, 2019, which is a continuation of U.S. application Ser. No. 15/277,892, filed Sep. 27, 2016, U.S. Pat. No. 10,114,814, Issued Oct. 30, 2018, which claims priority under 35 U.S.C. § 119(e) to U.S. Provisional Application Ser. No. 62/233,657, filed Sep. 28, 2015, each of which is expressly incorporated by reference herein.

BACKGROUND

The present disclosure generally relates a system and method for processing and actionizing structured and unstructured experience data. The system and method described herein may be used for processing disparate experience data sources such as user records, surveys, review sites, and social media.

SUMMARY

The present disclosure is a system and method for processing and actionizing structured and unstructured experience data. In some embodiments, a system may include a natural language processing ("NLP") engine configured to transform a data set into a plurality of concepts within a plurality of distinct contexts, and a data mining engine configured to process the relationships of the concepts and to identify associations and correlations in the data set. In some embodiments, the method may include the steps of receiving a data set, scanning the data set with an NLP engine to identify a plurality of concepts within a plurality of distinct contexts, and identifying patterns in the relationships between the plurality of concepts.

One aspect of the present disclosure is a system for processing and actionizing experience data. The system comprises a server comprising a natural language processing (NLP) engine, and a relational database. Communications are received at the server, and each of the communications comprises comment data. The comment data from each of the communications is stored at the relational database. The comment data from each of the communications is parsed for individual phrases to generate a plurality of phrases. One or more phrases are selected from the plurality of phrases based on a predetermined parameter. At the NLP engine one or more annotations are predicted for the one or more phrases based upon a score.

Another aspect of the present disclosure is a method for processing and actionizing patient experience data. The method includes receiving at a server a plurality of communications. Each of the plurality of communications comprises comment data. The method also includes storing the comment data of each of the plurality of communication at a relational database. The method also includes parsing the comment data for individual phrases to generate a plurality of phrases. The method also includes selecting one or more phrases from the plurality of phrases based on a predetermined relationship. The method also includes predicting at a NLP engine one or more annotations for the one or more phrases based upon a score.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 4 is an illustration of a response table into which data that has undergone ETL is saved;

FIG. 5 is an illustration of a manual batching report table within which the preliminary analysis of pipelined data is represented;

FIG. 6 is an illustration of an annotation table which represents the final analysis of pipelined data;

DETAILED DESCRIPTION

This present disclosure relates to a system and method for processing and actionizing structured and unstructured experience data. The present disclosure includes a hybrid NLP pipeline, which, combined with machine learning and crowd sourcing, recognizes the sentiments, themes, and named entities within the data. Pipelined data is then visualized on a user dashboard, outlining areas where the user has performed well and areas where the user can improve.

In the present disclosure, the terms "field," "data element," and "attribute" may be used as synonyms, referring to individual elements of digital data. Aggregates of data elements may be referred to as "records" or "data structures." Aggregates of records may be referred to as "tables." Aggregates of tables may be referred to as "databases." "Data mining" is, for example, an analytic technique to dynamically discover patterns in historical data records and to apply properties associated with these records to production data records that exhibit similar patterns. "Unordered," for example, means that the chronology of a record's attributes is not known. "Unstructured," for example, means that the attributes of a comment or phrase are not known.

Figure 1:
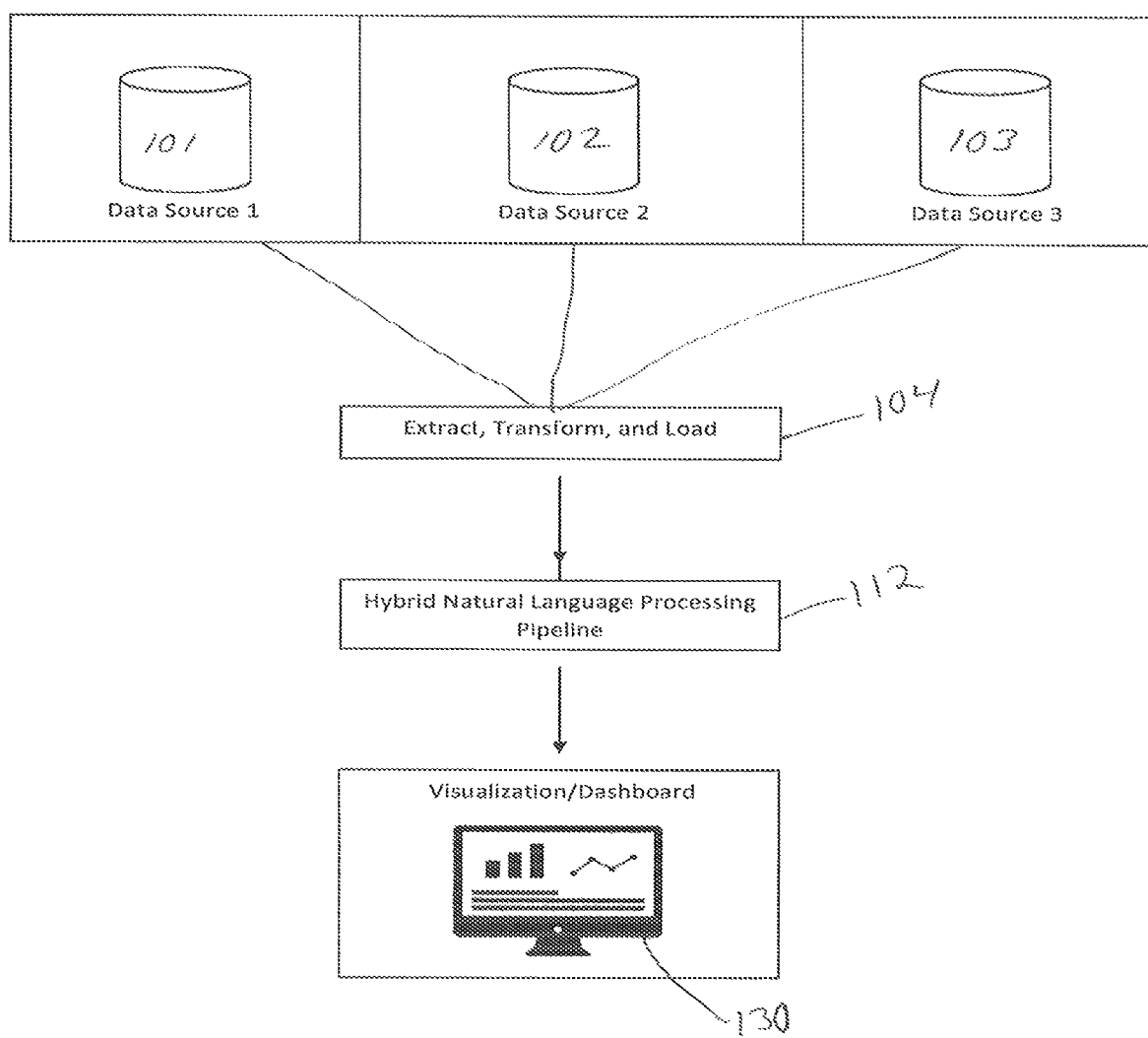
FIG. 1 is a diagrammatic flow chart of the overview of a system for processing and actionizing experience data.
Figure 2:
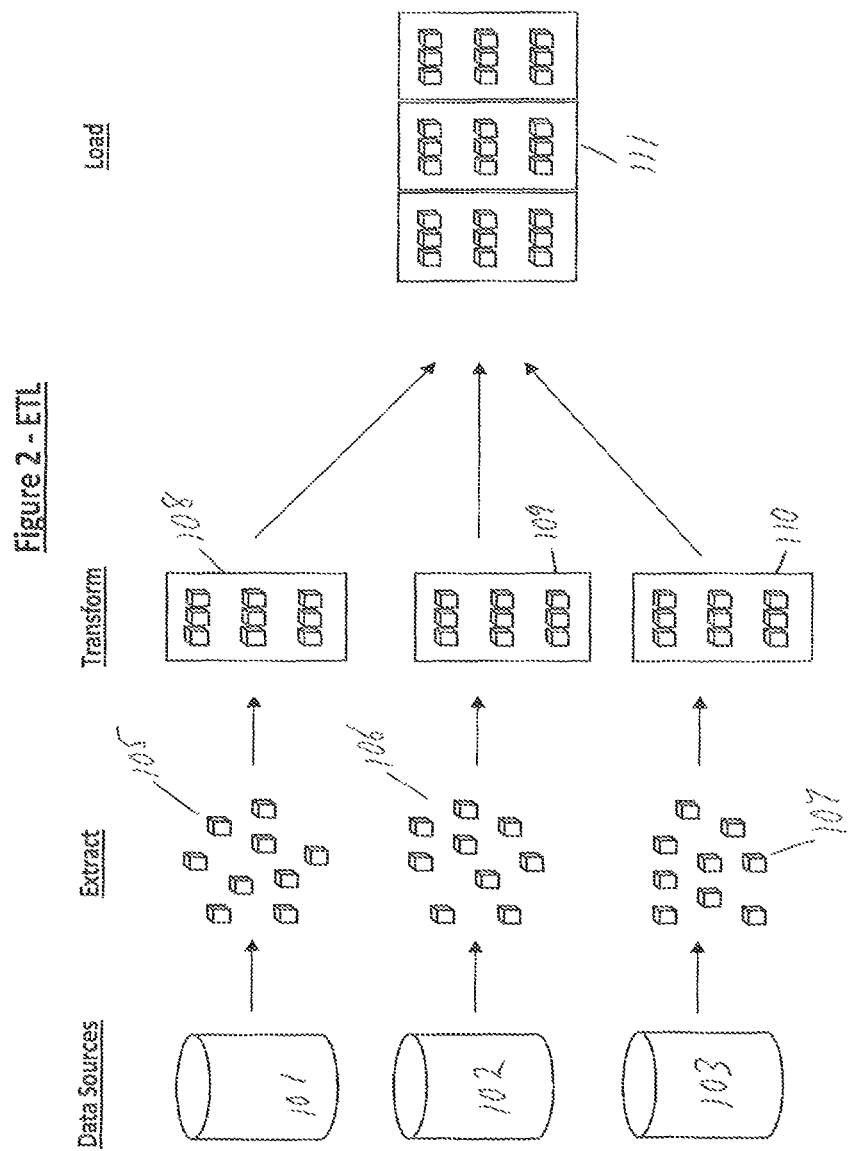
FIG. 2 is an illustration of how an ETL job of FIG. 1 is completed using sample input data and sample output data according to the embodiment of the present invention.
Figure 3:
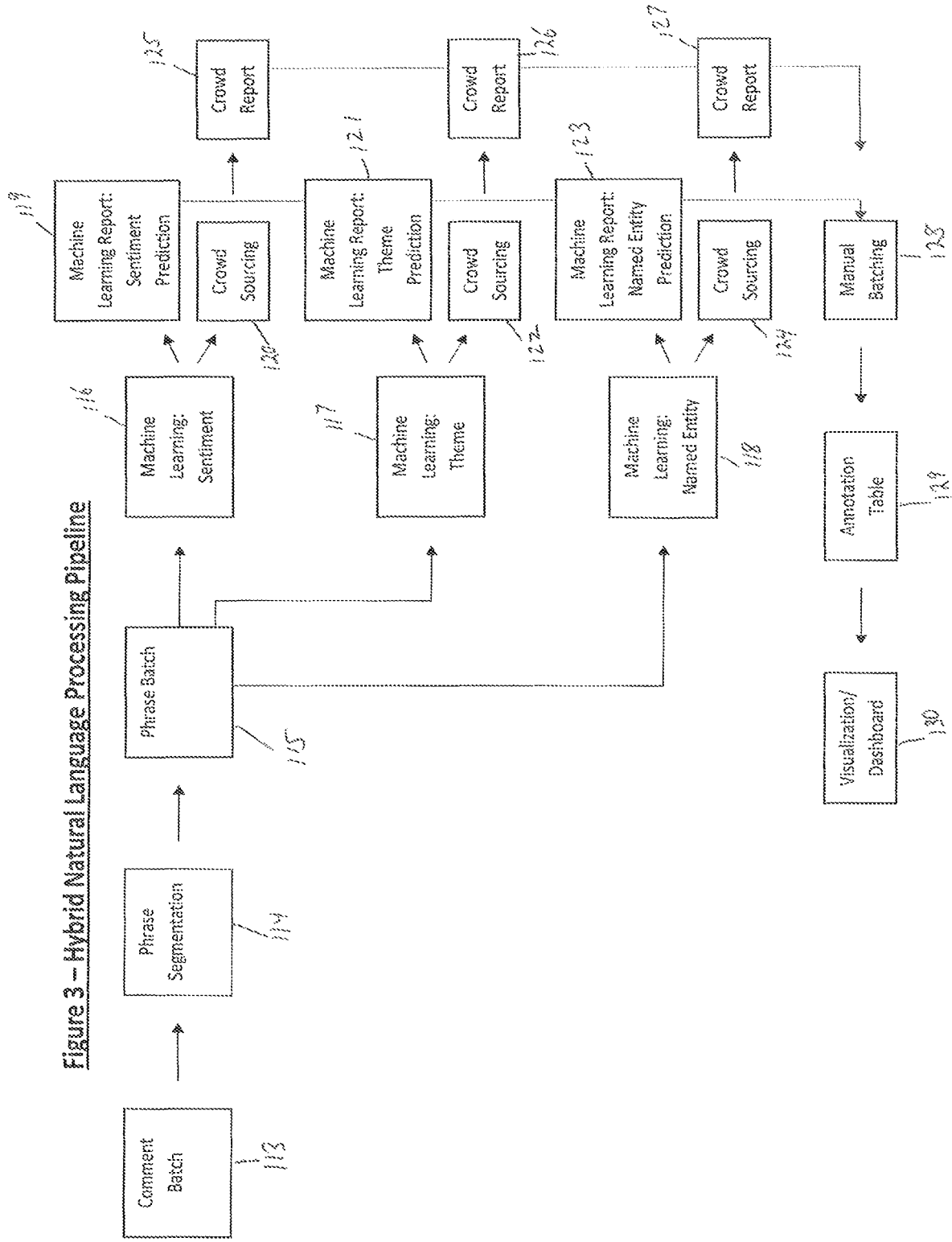
FIG. 3 is a flow chart of the hybrid NLP pipeline of FIG. 1.

FIGS. 1-3 show an embodiment of the present disclosure that is visualized, for example, on the dashboard 130. FIG. 1 provides an overview of the system. It illustrates how input, that is, comments, from various sources are aggregated to then undergo ETL 104 to become structured and ordered information. In one example, the sources may be hospital surveys, verbatims, and social media posts. In another example, the sources may be employment surveys, exit surveys, and social media posts. In yet another example, the sources may be airline, hotel, restaurant, or financial services customer surveys or online reviews. This information next enters the hybrid NLP pipeline 112, where comments are segmented into phrases, the phrases studied to recognize sentiment, theme, and any named entity, which are finally approved and reflected in a batching report 128. The finalized information within the batching report is then visualized on a user's dashboard 130 or provided via an API, providing business intelligence for the user to act upon the inputted patient feedback.

FIG. 2 illustrates the ETL process of FIG. 1. Box 101 represents patient feedback data in HTML form, such as posts from social media. This data is unstructured and unordered. In one example, box 102 represents data from hospital surveys. This data is structured, but unordered. In another example, box 103 represents data from adaptive rounding surveys. This data is structured and ordered; thus requiring minimal extraction and transformation.

During extraction, 105 through 107, information from the data sources is converted from unstructured form to structured form. During transformation, 108 to 110, it is also converted from unordered to ordered form. Once input is extracted and transformed, loading 111 occurs wherein its attributes are recognized and loaded into the response table, shown in FIG. 4, thereby establishing the input's record. As shown in FIG. 4, each row of the table represents a different record. Each record may comprise at least one of an input's text and date (i.e., its timestamp). Depending on the data source, however, the record may also contain an input's unit, the name of a professional about whom the input was written, and the input author's demographics.

Next, as shown in FIG. 3, from the response table of FIG. 4, a subset of comments, or a comment batch 113, enters the hybrid NLP pipeline. The hybrid NLP pipeline operates on a server. Comments are parsed for individual phrases based upon punctuation 114. A phrase includes either a full sentence or a part of a sentence that represents a complete thought. From this, a phrase batch is developed 115 for machine learning analysis. Each phrase is given a phrase identification number. Through machine learning, a phrase's sentiment, theme, and any named entity therein is predicted based upon a percentage of likelihood, 116 through 118. The machine learning for these areas, 116 through 118, is preferably done simultaneously.

Machine learning may produce a prediction for anyone of the areas only if the percentage of likelihood satisfies a predetermined relationship, for example a threshold percentage. This prediction along with the percentage of likelihood on which the prediction is based will be noted in the machine learning reports for sentiment 119, theme 121, and named entities 123. If the predetermined relationship is not satisfied, however, machine learning will not produce a prediction for an area. Instead, the phrase may be sent to be crowd sourced or individually reviewed to determine what the ambiguous sentiment, theme, or named entity is, 120, 122, or 124. Then, upon the majority vote of crowd-sourcers or individual review, a prediction will be made and reflected in the respective crowdsourcing report, 125 through 127. Other criteria than majority, such as specific percentages, may be used instead of simple majority.

Alternatively, instead of sending the phrase for crowd-sourced or individual review, a rule or set of rules may be used to determine what the ambiguous sentiment, theme, or named entity is 120, 122, or 124.

For example, in regards to sentiment, machine learning attempts to predict whether a phrase is positive or negative 116. However, if the threshold percentage is set at 90% and if machine learning can only predict that the likelihood that a phrase is positive is 84%, it will not produce a sentiment prediction 119. The phrase will instead be crowd sourced 120 and voted upon to establish its sentiment prediction, which will be reflected in the sentiment crowd report 125.

The prediction results of the machine learning reports and the crowd sourcing reports for each phrase are next compiled and reviewed during the batching step 128 (manual or automatic). Preferably, for manual batching, there is a human review of the predictions in which any area's-sentiment's, theme's, or named entity's machine learning or crowd sourcing prediction is marked as true or false, or, in other words, approved or rejected autonomously and with final authority at step 128. The purpose of the step is to ensure accuracy. Upon completion, as shown in Table Two of FIG. 5, each phrase is then listed by its identification number and the phrase's sentiment and any named entity therein is reflected. The phrase is also given a primary and possibly a secondary tag. A primary tag reflects what a phrase is mainly about. This usually corresponds with the subject of a phrase. A secondary tag is optional and reflects a phrase's general theme. A phrase can have multiple primary or secondary tags.

Once the results of the batching (manual or automatic) are finalized, they are inputted into the annotation table 129 (and as shown in Table Three of FIG. 6). At the annotation table 129, each phrase from the comment batch 113 is listed by phrase identification number and mirrors the records of the manual batching report of FIG. 5, except that there is no approval step. The information reflected in the annotation table of FIG. 6, is thus the finalized records of each phrase, which is then visualized on a user's dashboard 130 to provide the user with business intelligence and allow the user to actionize patient feedback, 101 through 103.

The NLP engine preferably predicts if a phrase is positive or negative. The NLP engine preferably tags each phrase based on a subject matter of the phrase.

The system further comprises a dashboard for providing business intelligence for the user to act upon the inputted patient feedback. This information can also be provided via an APL The comment data of each of the plurality of communications is preferably extracted at server, wherein the extracted texts are transformed to a format compatible with a target, and wherein the transformed texts are loaded into a plurality of tables of the relational database.

The comment data from each of the plurality of communications is preferably parsed for individual phrases based upon punctuation or linguistic structure. A phrase's annotation preferably comprises one of a phrase's sentiment, theme, or any named entity therein. The plurality of communications is preferably collected from publicly available data or uploaded from an entity. In one example, the entity may be a hospital, medical provider, employer, third party service provider or data collection service or the like. Phrases that receive a complete annotation (sentiment, primary tag, secondary tag with an optional driver), also generate an improvement action because the logic of the annotation is structured such that there is one improvement for each unique annotation. Each phrase of the plurality of phrases is preferably provided with an identification.

A system for processing and actionizing experience data comprises a server comprising a natural language processing (NLP) engine, and a relational database. The server operates, for example, on AMAZON web services ("AWS"), and the engine is written in PYTHON running on the server, for example. The relational database is, for example, Postgresql running on AWS. The communications received at the server are preferably scraped comments from Internet web sites such as YELP, ZOCDOC, or the like. Each of the communications comprises comment data such as survey comments from patient satisfaction surveys or employment surveys or customer feedback surveys. The relational database preferably maps sources to their comments. The comment data from each of the communications is parsed for individual phrases to generate a plurality of phrases, preferably by linguistic structure. One or more phrases are selected from the plurality of phrases based on a predetermined parameter. At the NLP engine one or more annotations are predicted for the one or more phrases based upon a predetermined relationship, for example a score, such as a sentiment and a theme assigned to each phrase with a score meeting a criteria, such as being greater than 0.5. Any other suitable relationship may be used.

For example, a web-scraped comment from YELP from a patient that stated "My nurse was mean and she hit me," is received at the server. A survey comment that, "I like the food. I do not like the beds" is also received at the server. The comments are parsed into: My nurse was mean; she hit me; I like the food; and I do not like the beds. In this example, phrases are selected based on linguistic characteristics—the content having more than three words. So the following phrases are selected: My nurse was mean; I like the food; and I do not like the beds. Next, at the NLP engine one or more annotations are predicted for the one or more phrases based upon a score. Negative (0.7)+Attitude (0.6): Negative+Attitude: My nurse was mean. Positive (0.8)+Food (0.4): Positive: I like the food. Negative (0.3)+Comfort (0.9): Comfort: I do not like the beds.

The hybrid natural language processing pipeline ("pipeline") is a natural language batch-processing system. The input for the pipeline is organized as "batches" (groups) of "documents." Alternatively, the pipeline processes one batch at a time. Pieces of each document are referred to as "phrases." A phrase can be any text within the document, including the entire document. The pipeline's primary function is to take batches of comments, split the comments into phrases and then assign an annotation to each phrase. An annotation, for example, is a complete set of categorical or numeric labels.

The hybrid natural language processing pipeline combines four components to generate high quality annotations: Rulebased, Machine, Crowd, and Annotation. The rulebased component uses rules to generate individual labels for any annotation type with 100% certainty. The machine component generates labels for any phrase with variable certainty. The crowd component generates labels for any phrase using an open-call pool of workers. The annotation component uses logic to decide which labels from which components are ultimately assigned to each phrase.

A method for processing and actionizing experience data begins with collecting data from multiple sources: Internal sources, such as grievances, nurse rounding, call transcripts, etc; Public sources, such as Hospital Compare, CMS, Doctor Review Sites and Social Media; and Surveys, such as CARPS, HCAHPS, CG-CARPS and custom surveys, as well as employee engagement surveys and customer feedback surveys. The next step is to Perform Annotations with Hybrid NLP Pipeline. The annotations preferably comprise: Themes, Named Entities, Sentiment, Category Discovery, and Category Annotation. The next step is to generate improvement suggestions for each category. The next step is to combine qualitative and quantitative data with new data collected by repeating the process from the first step.

Figure 7:
FIG. 7 is an illustration for a web page for a dashboard of a system for processing and actionizing experience data.

FIG. 7 is an illustration for a web page 700 for a dashboard of a system for processing and actionizing experience data.

Figure 8:
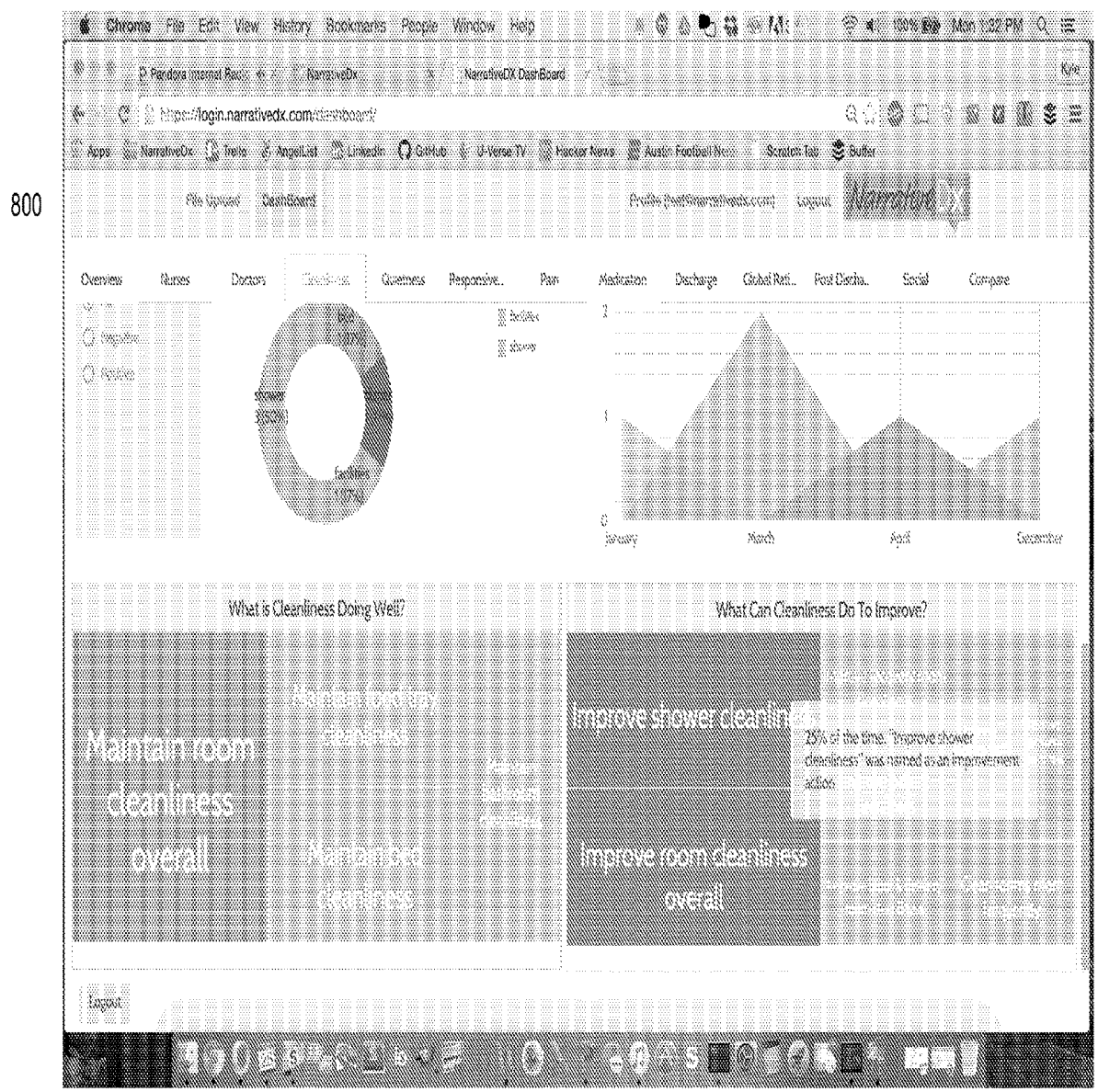
FIG. 8 is an illustration for a web page for a dashboard of a system for processing and actionizing experience data.

FIG. 8 is an illustration for a web page 800 for a dashboard of a system for processing and actionizing experience data.

Figure 9:
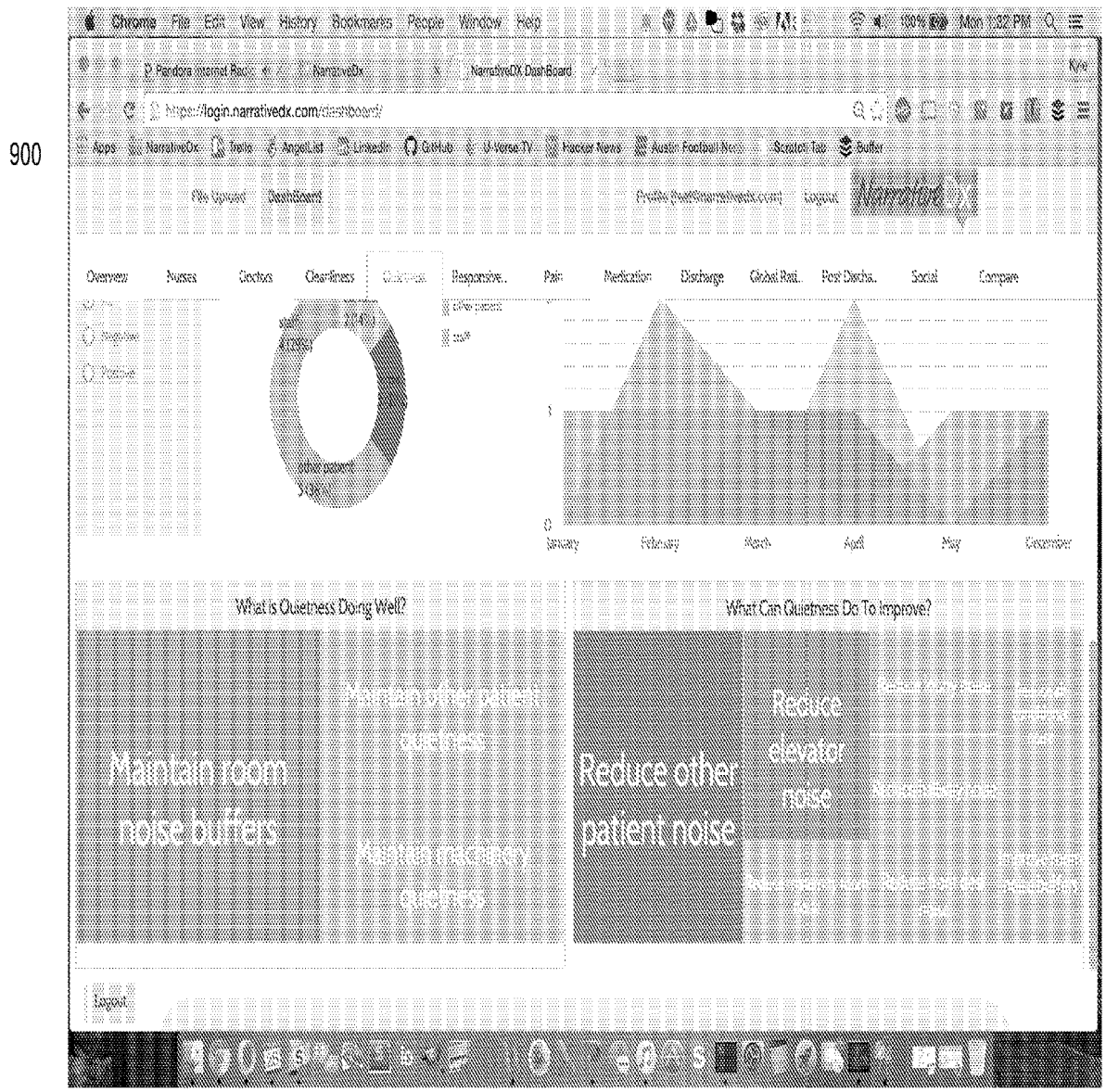
FIG. 9 is an illustration for a web page for a dashboard of a system for processing and actionizing experience data.

FIG. 9 is an illustration for a web page 900 for a dashboard of a system for processing and actionizing experience data.

The server includes a CPU component, a graphics component, PCI/PCI Express, RAM memory, non-removable storage, removable storage, Network Interface, including one or more connections to a fixed network, and a SQL database. Included in the memory, are the operating system, the SQL server, and computer programs. The data server also includes at least one computer program configured to receive data uploads and store the data uploads in the SQL database. The SQL server comprises of other components of SQL server that can be installed separately from the SQL database engine.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS, and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400, and Apple OS.

The underlying protocol at the server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

Natural language processing ("NLP") is a field of computer science, artificial intelligence, and linguistics concerned with the interactions between computers and human languages. It involves the processing of a natural language input. A natural language input is generally language used by a person (as opposed to a computer language or other artificial language), including all of the idioms, assumptions and implications of an utterance in a natural language input. Natural language processing implemented by a computer is typically an attempt to determine the meaning of a natural language input such that the natural language input can be "understood" and/or acted on by the computer. To interact with humans, natural-language computing systems may use a data store that is parsed and annotated.

In the healthcare and employer industries, for example, there is a need for systems and methods that are able to rapidly parse, combine, and interpret multiple structured and unstructured data sources. Healthcare information, such as information related to a patient's care experience and satisfaction, is fractured across many isolated data stores in varying formats. The same may be true regarding employment or employee satisfaction. To compound the problem, even when data is available, there are no easily available means of processing this data with a high degree of accuracy or efficiency.

Moreover, in health care data management systems today, only about 20% of data is structured or machine-readable. Information that is not structured or machine readable may be ignored or unusable in conventional analytics systems. Online data sources, such as doctor review sites and social media, consist of largely unstructured data. Additionally, data collected from surveys or other public and private sources is often a mixture of both unstructured and structured data that varies between data stores. Due to lack of interoperability between these data stores and formats, these sources have not been analyzed in conjunction with one another.

Significantly, online data sources have risen in importance for healthcare providers, similar to most customer-focused industries. Online data sources may also be important for employers and other industries that collect customer feedback. Data from online sources is extracted, transformed, and loaded into a structured/compatible form. Extract, Transform, Load (ETL) jobs extract data from a source, transform the extracted data using one or more transformations to a format compatible with a target, and load the data into the target, for example a target database. Extraction refers to actually obtaining the data from individual data sources. Transformation indicates processing the data to put it into a more useful form or format. Loading refers to the process of loading the data into the tables of a relational database.

Attempts have been made to use customer-focused NLP systems from the hospitality and restaurant industries in other spaces, but these systems' lack of specificity for particular uses make them inaccurate and ineffective for actionizing feedback. Further, investments in such technologies do not yield the comprehensive, reliable, or actionable information necessary to improve an organization's viability, for example, a healthcare organization. Instead, the value-added by the data reviewed by these technologies is diminished as true data integration and interoperability is not achieved.

There have been few attempts to construct healthcare-specific or employee engagement-specific NLP systems that may automatically collect and annotate key information related to the patient's care experience and satisfaction, such as the patient's sentiment regarding the experience, identification of key staff involved in the experience and key themes describing the care experience.

Performing these annotations with a high degree of accuracy has proven to be a difficult task due to the complex nature of language, the many ways that a care experience concept can be expressed, the inherent complexity of the subject matter, and the distributed and varied nature of the available data sources. As a result, NLP software tends to be large, expensive and complex, difficult to develop and maintain, and demands significant processing power, working memory, and time to run. Further, when attempting to process data from isolated sources in differing formats, annotation accuracy is difficult to achieve. This is especially true for unstructured data—annotations regarding sentiments, named entities, key themes and the like that may fall below a traditional threshold for statistical significance. Nevertheless, unstructured data may indicate real problems with care experiences that are of value to healthcare administrators. Despite its value, it has traditionally been difficult to process and understand.

Furthermore, some methods of data extraction are slow and ineffective. These systems, however, which use only a fraction of the data available, may reduce cost and improve outcomes. If systems and methods had the capability of using the knowledge incorporated within unstructured data in an efficient manner to improve experience, the benefits would be tremendous. By using this knowledge, a user's experience could be improved and cost reduced through quality improvement, efficiency, comparative effectiveness, safety, and other analytics powered by this data.

Thus, there is a need in the field of processing experience data, and more specifically in the field of processing disparate data sources such as medical records, employee records, government surveys, employee surveys, review sites and social media, for new and improved systems and methods for processing data. In particular, systems and methods are needed that are able to rapidly parse, combine, and interpret multiple structured and unstructured data sources. Described herein are devices, systems, and methods that address the problems and meet the identified needs described above.

From the foregoing it is believed that those skilled in the pertinent art will recognize the meritorious advancement of the present disclosure and will readily understand that while the present disclosure has been described in association with one or more embodiments thereof, and other embodiments illustrated in the accompanying drawings, numerous changes modification and substitutions of equivalents may be made therein without departing from the spirit and scope of the present disclosure which is intended to be unlimited by the foregoing except as may appear in the following appended claim. Therefore, the embodiments of the present disclosure in which an exclusive property or privilege is claimed are defined in the following appended claims.

What is claimed:

1. A method for processing and actionizing experience data, the method comprising:
   receiving, by a server, a plurality of communications, wherein each of the plurality of communications comprises comment data, wherein the comment data comprises structured or unstructured data;
   parsing, by the server, the comment data from each of the plurality of communications for individual phrases to generate a plurality of phrases in response to receiving the plurality of communications;
   predicting, by the server with a natural language processing (NLP) engine, one or more annotations for each of the plurality of phrases based upon a machine learning score in response to parsing the comment data, wherein each of the one or more annotations comprises a sentiment of the corresponding phrase and a primary tag indicative of a subject matter of the corresponding phrase, other than sentiment
   determining, by the server, whether a certainty associated with the one or more annotations is less than a predetermined threshold based on the machine learning score; and
   predicting, by the server, the one or more annotations for the plurality of phrases based upon a reference score in response to determining that the certainty is less than the predetermined threshold.

2. The method of claim 1, wherein predicting the one or more annotations comprises classifying the plurality of phrases to identify the primary tag based on a predetermined ontology.

3. The method of claim 2, wherein the predetermined ontology comprises a healthcare domain ontology.

4. The method of claim 1, further comprising generating, by the server, a dashboard web page for a user that includes the one or more annotations in response to predicting the one or more annotations.

5. The method of claim 1, further comprising:
determining, by the server, whether a certainty associated with the one or more annotations is less than a predetermined threshold based on the machine learning score; and
predicting, by the server, the one or more annotations for the plurality of phrases based upon a reference score in response to determining that the certainty is less than the predetermined threshold.

6. The method of claim 1, further comprising receiving, by the server, the reference score from an individual review.

7. The method of claim 1, further comprising:
storing, by the server, the comment data of each of the plurality of communications at a relational database; and
storing, by the server, the one or more annotations at the relational database, wherein each record corresponds to an annotation, and wherein each record includes the sentiment and the primary tag.

8. The method of claim 1, wherein predicting the one or more annotations comprises identifying a named entity in the plurality of phrases.

9. The method of claim 1, wherein predicting the one or more annotations comprises extracting a secondary tag indicative of a theme from the plurality of phrases.

10. A system for processing and actionizing experience data, the system comprising a server having a natural language processing (NLP) engine, wherein:
the server is to:
receive a plurality of communications, wherein each of the plurality of communications comprises comment data, wherein the comment data comprises structured or unstructured data; and
parse the comment data from each of the plurality of communications for individual phrases to generate a plurality of phrases in response to receiving the plurality of communications;
the NLP engine is to predict one or more annotations for each of the plurality of phrases based upon a machine learning score in response to parsing the comment data, wherein each of the one or more annotations comprises a sentiment of the corresponding phrase and a primary tag indicative of a subject matter of the corresponding phrase, other than sentiment
determine whether a certainty associated with the one or more annotations is less than a predetermined threshold based on the machine learning score; and
predict the one or more annotations for the plurality of phrases based upon a reference score in response to a determination that the certainty is less than the predetermined threshold.

11. The system of claim 10, wherein to predict the one or more annotations comprises to classify the plurality of phrases to identify the primary tag based on a predetermined ontology.

12. The system of claim 11, wherein the predetermined ontology comprises a healthcare domain ontology.

13. The system of claim 10, wherein the server is further to generate a dashboard web page for a user that includes the one or more annotations in response to prediction of the one or more annotations.

14. The system of claim 10, wherein the server is further to:
determine whether a certainty associated with the one or more annotations is less than a predetermined threshold based on the machine learning score; and
predict the one or more annotations for the plurality of phrases based upon a reference score in response to a determination that the certainty is less than the predetermined threshold.

15. The system of claim 10, wherein the server is further to receive the reference score from an individual review.

16. The system of claim 10, further comprising a relational database, wherein the server is further to:
store the comment data of each of the plurality of communications at the relational database; and
store the one or more annotations at the relational database, wherein each record corresponds to an annotation, and wherein each record includes the sentiment and the primary tag.

17. The system of claim 10, wherein to predict the one or more annotations comprises to identify a named entity in the plurality of phrases.

18. The system of claim 10, wherein to predict the one or more annotations comprises to extract a secondary tag indicative of a theme from the plurality of phrases.

19. One or more non-transitory computer-readable storage media comprising a plurality of instructions stored thereon that, in response to being executed, cause a server to:
receive a plurality of communications, wherein each of the plurality of communications comprises comment data, wherein the comment data comprises structured or unstructured data;
parse the comment data from each of the plurality of communications for individual phrases to generate a plurality of phrases in response to receiving the plurality of communications;
predict one or more annotations for each of the plurality of phrases based upon a machine learning score in response to parsing the comment data, wherein each of the one or more annotations comprises a sentiment of the corresponding phrase and a primary tag indicative of a subject matter of the corresponding phrase, other than sentiment;
determine whether a certainty associated with the one or more annotations is less than a predetermined threshold based on the machine learning score; and
predict the one or more annotations for the plurality of phrases based upon a reference score in response to determining that the certainty is less than the predetermined threshold.

20. The one or more non-transitory computer-readable storage media of claim 19, further comprising a plurality of instructions stored thereon that, in response to being executed, cause the server to:
determine whether a certainty associated with the one or more annotations is less than a predetermined threshold based on the machine learning score; and
predict the one or more annotations for the plurality of phrases based upon a reference score in response to determining that the certainty is less than the predetermined threshold.

* * * * *